May 18, 1965 K. D. EARLEY ETAL 3,183,937
SEALING MEANS FOR OPTICAL MASER
Filed June 5, 1962 2 Sheets-Sheet 1

INVENTORS.
KENNETH D. EARLEY
THOMAS G. POLANYI
WILLIAM WATSON

BY

ATTORNEY

May 18, 1965     K. D. EARLEY ETAL     3,183,937
SEALING MEANS FOR OPTICAL MASER

Filed June 5, 1962     2 Sheets-Sheet 2

INVENTORS.
KENNETH D. EARLEY
THOMAS G. POLANYI
WILLIAM WATSON
BY
*Theodore Jay*
ATTORNEY

United States Patent Office 3,183,937
Patented May 18, 1965

3,183,937
SEALING MEANS FOR OPTICAL MASER
Kenneth D. Earley, Bayside, Thomas G. Polanyi, Beechhurst, and William Watson, Flushing, N.Y., assignors to General Telephone and Electronics Laboratories, Inc., a corporation of Delaware
Filed June 5, 1962, Ser. No. 200,239
5 Claims. (Cl. 138—89)

Our invention is directed toward gaseous optical masers.

A gaseous optical maser typically comprises an elongated hollow glass tube sealed at both ends and filled with a mixture of neon and helium gases. Mirrors adapted to reflect a major portion of incident infrared radiation and to transmit a minor portion of this radiation are positioned adjacent the ends of the tube. [These mirrors can be positioned inside or outside of the tube.] Electrodes are secured to the outside surface of the tube at suitably spaced apart positions. When an alternating voltage of suitable frequency is impressed across the electrodes, a gas discharge is produced and a beam of infrared radiation is generated, a portion of this beam passing through both ends of the tube and both mirrors as an output.

The beam so produced is generated through an interaction of radiation and matter. Radiation can be regarded as an accumulation of moving particles or photons, each of which has a quantity of energy associated with it. This accumulation of photons constitutes an electromagnetic wave. When all photons have the same energy, the wave will have one frequency uniquely determined by the photon energy. When the photons have different energies, the wave will contain a plurality of wave components of different frequencies, these frequencies corresponding to the various photon energies.

Interaction of radiation with matter ensues when particles of matter (i.e. atoms or molecules) either absorb or emit photons. Usually, atoms and molecules exist in a stable non-radiating or ground state in which energy is neither absorbed or emitted. This state corresponds to a fixed quantity or level of internal energy. When an atom in the ground state is struck by an incident photon, this atom can absorb the energy of the photon and be placed in a higher or "excited" state, provided that the energy of the photon is at least equal to the difference in energy of the ground and excited states. Similarly, when the energy level of an atom is suddenly changed from one state to a lower energy state, a photon will be produced. The energy of this photon will be equal to the difference in energy between these states.

An atom in an excited state can emit a photon spontaneously and revert to either its ground state or some intermediate state. However, during the period in which the atom remains excited, it can be stimulated to emit a photon by being irradiated or struck by an incidental photon if the energy of this photon is equal to that of the photon which would otherwise be emitted spontaneously. As a result of such stimulation, the incoming photon or wave is augmented by the one given up by the excited atom. This released wave falls in phase with the wave that triggered its release. Hence, an amplifying action ensues. This phenomenon is known as stimulated emission.

In any collection of atoms, as a result of energy transfers produced by random collisions and the like, the energy levels of the atoms in the collection are constantly changing. Under ordinary conditions, there are more atoms in the lower energy states than in the higher states. Consequently, when an electromagnetic wave of appropriate frequency is directed upon the collection, more photons will be absorbed than emitted, and the wave leaving the collection will have less energy than the incident wave and thus will be attenuated.

In the maser, however, the distribution of energy levels is changed by a process of "pumping" so that there will be more atoms in the upper state than in the lower state of a selected transition. This process consists of injecting energy into the collection of atoms to raise the atoms into an excited state. Then, an incident wave or beam of photons will produce more downward changes than upward changes in the energy levels of the atoms in the collection. More photons will be emitted than absorbed, and the output wave will have more energy than the input wave.

In the maser, a suitable material for maser action is enclosed in a reflecting chamber or cavity resonator having at least two separated reflecting walls. Then a wave starting out anywhere between the walls of the chamber will grow in amplitude until the wave reaches either wall where it will be reflected back into the medium. Inevitably there are losses due to imperfect reflections and absorption. However, if the amplification by stimulated emission is large enough to compensate for these losses, a standing wave can build up in the resonator. Since this wave can be at microwave frequencies, the term "maser" has been used, maser being an acronym for microwave amplification by stimulated emission of radiation.

At microwave wavelengths, for example centimeter wavelengths, it is not difficult to build a resonator having the dimensions of a wavelength and so designed to oscillate or amplify at a single frequency. However, optical masers produce waves or beams of optical wavelengths. A single optical wavelength is measured in thousands of Angstroms, and consequently is too small to permit construction of a resonator having dimensions of a single wavelength. In the gaseous optical maser, the gas filled tube contains the active medium. This medium is located in the resonator constituted by the reflecting walls. The resonator has dimensions thousands of times greater than the emission wavelength. A wave that starts in any position between the reflecting walls, for example near one end, will travel along the axis of the tube with increasing amplitude until the wave reaches the other end. At this point the wave is reflected back toward the starting point with further increase in amplitude. The gain in energy of the wave during repeated passages will compensate for losses at the reflecting walls and elsewhere and a standing wave will build up. Each time the wave is reflected at a reflecting wall, a very small portion of the wave passes through this end. This portion is continually reinforced because of repeated reflections and, thus reinforced, constitutes the optical maser output beam or wave.

In a known gaseous optical maser, neon and helium atoms constitute the active material. Initially, both groups of atoms are in the ground state. When the gas discharge is initiated, free electrons are produced; these electrons bombard the helium atoms and, as a result, some of these atoms gain energy and are raised to a higher energy level. When a helium atom in such a higher level collides with a neon atom, the helium atom loses energy, while the neon atom gains this energy and is raised to a higher energy level. Initially, the neon atoms thus excited spontaneously emit photons of infrared radiation and fall to lower energy levels. The spontaneously emitted photons impinge upon other excited neon atoms which then emit photons of infrared radiation by stimulated emission. As a result, the desired output wave begins to be generated almost instantaneously and thereafter, the effect of spontaneous emission is minimized and stimulated emission effects are predominant.

The output of the maser is highly directional since the waves which are emitted must make many repeated passages without deviating very much from a path along the axis of the resonator. [If a wave is inclined at an angle with respect to this path, it will leave the resonator after few if any repeated reflections without appreciable growth in amplitude.]

The output waves are monochromatic (i.e. have essentially a single frequency) since stimulated emission takes place most strongly at frequencies in the middle of the band of frequencies emitted by spontaneous radiation. The initial stimulated emission at these middle frequencies will cause further emission at the same frequencies so that the output waves will contain only an extremely narrow range of frequencies or wavelengths.

Further, the output waves are approximately unidirectional plane waves; all wave fronts fall in planes perpendicular to the direction of propagation and are spacially coherent. Finally, since the output waves are essentially monochromatic, successive wave maxima or minima will pass a fixed point in space at predetermined regular intervals. Stated differently, the output waves exhibit temporal coherence.

In our experimental work we found that operation of gaseous optical masers could not be maintained over an extended interval of time due to contamination of the neon-helium gas mixture by gaseous impurities either originally absorbed during preliminary processing and gradually released into the gas mixture or introduced from the atmosphere through leakage through the end seals.

It is an object of our invention to provide a new and improved gaseous optical maser which is adapted for continuous operation over a time interval sharply in excess over that heretofore obtainable.

Another object is to provide a new and improved gaseous optical maser of the character indicated in which the ends of the gas filled tube are sealed off in such manner as to eliminate any leakage therethrough.

Still another object is to extend the time interval for continuous operation of a gaseous optical maser to a value sharply in excess of that previously obtainable.

Yet another object is to seal the ends of the gas filled tube in such manner as to provide high optical quality windows which are at the same time hermetically sealed.

These and other objects of our invention will either be explained or will become apparent hereinafter.

In accordance with the principles of our invention we provide a hollow tube open at both ends. A structure is bonded to each end to provide an hermetic seal. Each structure includes a first disc having an aperture substantially identical to that of each end of the tube sealed thereto with the tube and disc apertures being in registration. The surface of the first disc remote from the appropriate end of the tube carries an annular groove. A second disc without an aperture and also having one surface carrying an annular groove is secured to the first disc in such manner that the two grooves are aligned and together form an annular conduit.

The resultant unit, when filled with the requisite gas mixture and operated as an optical maser in a manner described in more detail below can be operated continuously for hundreds of hours without failure, the gas mixture remaining free from contamination.

Illustrative embodiments of our invention will now be described with reference to the accompanying drawings wherein.

Figure 1:
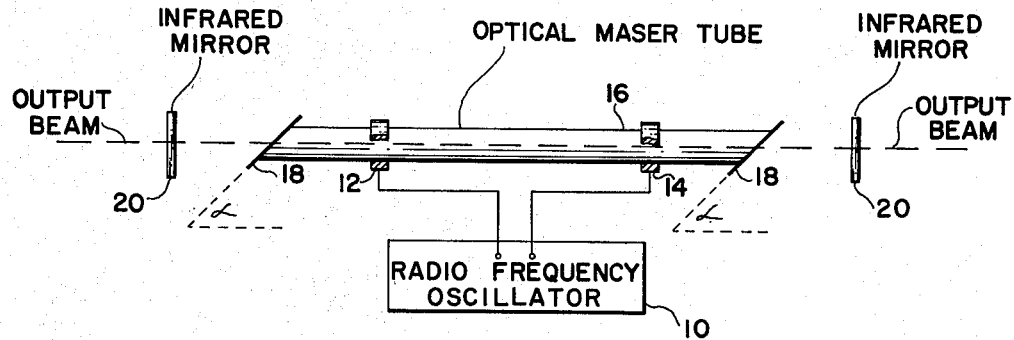
FIG. 1 shows a gaseous optical maser in accordance with our invention.
Figure 2:
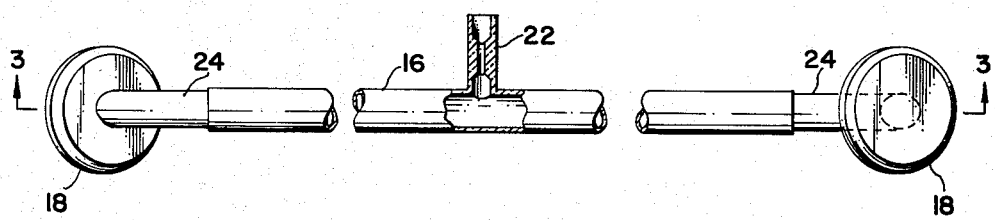
FIGS. 2 and 3 are side and top views respectively of the sealed maser tube employed in FIG. 1.
Figure 3:
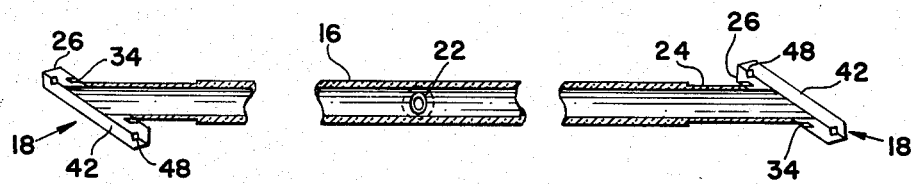
Figure 4:
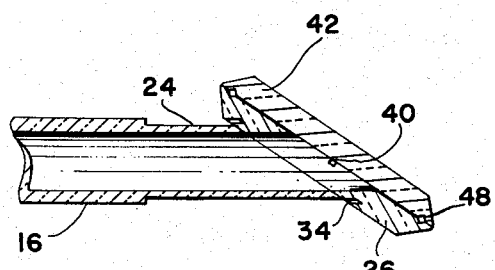
FIG. 4 is a detail view of an end portion of the sealed tube.
Figure 5:
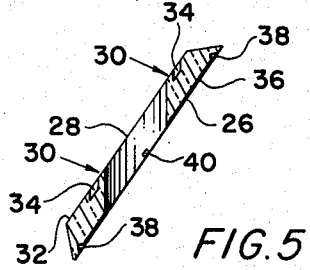
FIGS. 5 and 6 are rear and side views respectively of one disc employed in each sealed end portion of the maser tube.
Figure 6:
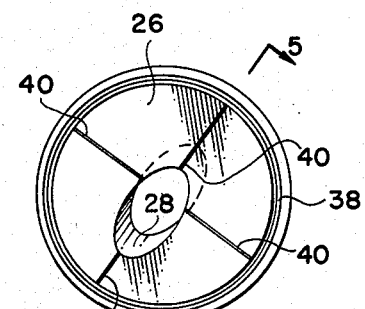
Figure 7:
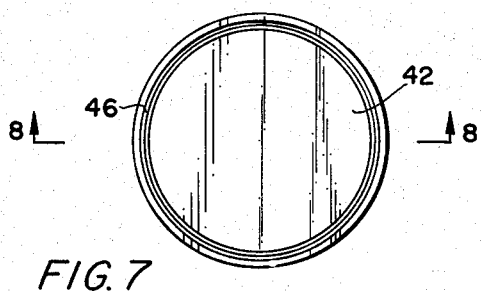
FIGS. 7 and 8 are front and side views respectively of another disc employed in each sealed end portion of the maser tube.
Figure 8:
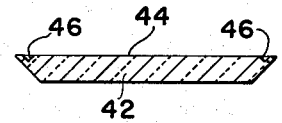
Figure 9:
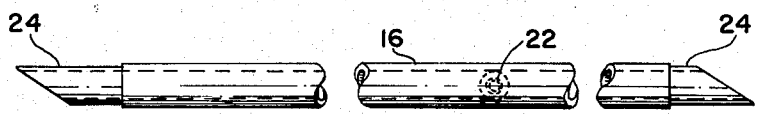
FIG. 9 is a side view of the maser tube prior to sealing the ends thereof.

Referring now to FIG. 1, an alternating voltage (at a frequency, for example, of 24 megacycles per second) generated by radio frequency oscillator 10 is applied between electrodes 12 and 14 concentrically and symmetrically disposed about a hollow maser tube 16 at spaced apart positions.

Tube 16 is formed of quartz, Vycor or the like and is sealed at both ends by structures 18 formed from the same material as the tube. The sealed tube is filled with the requisite gas mixture as for example a mixture of neon and helium gases containing 90% helium and 10% neon.

Mirrors 20 adapted to reflect a very high proportion of incident infrared radiation, for example 99%, and to transmit substantially all the remaining radiation are positioned externally of tube 16 adjacent corresponding structures 18. As indicated previously, the application of the alternating voltage creates a gas discharge and initiates maser action, that portion of the infrared radiation so produced which is transmitted through mirrors 20 as the maser output beam. Each of the structures 18 is shown as inclined at an angle $\alpha$ with respect to the direction of the maser beam. The complement of this angle, known as the Brewster angle, is such that no internal reflection from the maser beam can occur when the maser beam strikes either of structures 18. [The Brewster angle for any dielectric is that particular angle of incidence at which a wave polarized normal to the plane of incidence is wholly transmitted without reflection.] For quartz, the Brewster angle is about 55° for wavelengths in the neon infrared. These mirrors can be planar, confocal or spherical.

The maser tube and seals will be described in more detail with reference to FIGS. 2–8.

Tube 16 is provided with a centrally positioned exhaust tubulation 22 and two end sections 24 of reduced outer diameter. [The inner diameter of tube 16 remains uniform throughout its entire length.]

Each structure 18 comprises a first disc 26 having an aperture 28 placed into mating butting contact with the end aperture of tube 16, the periphery of this aperture being bonded to a circular lip 30 on surface 32 of disc 26. An annular groove or trough 34 surrounds lip 30. The opposite surface 36 of disc 26 carries another annular groove 38 adjacent the periphery and four transverse straight grooves 40 radiating outward from aperture 28 to groove 38.

A second solid disc 42 which serves as a window is secured to disc 26, the surface 44 of disc 42 which is in contact with surface 36 of disc 26 having an annular groove 46. Groove 46 is in registration with groove 38 to form an annular conduit 48.

Each of discs 26 and 42 can have a tapered edge, the discs being placed together such that these edges together define an annular surface. The discs can be joined together, for example, by applying a gas-oxygen torch tangentially to the annular surface and rotating the torch with respect to the discs to peripherally seal these discs together. The seal extends between the common periphery of the discs to channel 48, the seal progression being terminated by this channel.

Disc 26 is first secured to the tube 16 by wiping the end apertures with a low expansion glass in liquid form to form a glass bead. With the bead still liquid, the tube 16 and disc 26 are held together in a common jig or fixture until the bead solidifies and tube 16 is bonded to disc 26.

Trough 34 of disc 26 prevents breakage, cracking or the like during this process of bonding disc 26 to tube 16.

The annular conduit 48, while preventing cracking or leakage of the seal between discs 26 and 42, also entraps air.

In order to completely exhaust this entrapped air as the sealed tube is exhausted prior to being filled with the gas mixture, the transverse straight grooves 40 provide paths for this entrapped air to be withdrawn first from channel 48 into the main body of tube 16 and thereafter to be exhausted through tubulation 22.

Figure 10:
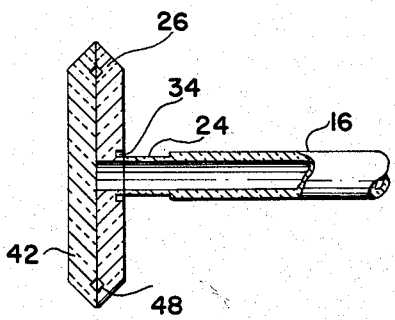
FIG. 10 shows a modification of the maser tube shown in FIGS. 2 and 3.

For applications where some internal reflection can be tolerated, it is not necessary to maintain this angle and indeed one or both of structures 18 can be so positioned as to be perpendicular to the direction of the maser beam as shown in FIG. 10.

Figure 11:
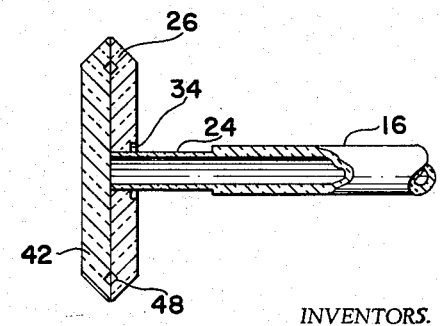
FIG. 11 shows another modification of this tube.

A modification of the end seal is shown in FIG. 11 wherein the annular groove or trough 34 of disc 26 extends to the aperture 28 and no lip is formed. Instead, the tube end section 24 extends into the aperture and is bonded to the periphery of the aperture by low expansion glass in the manner indicated previously.

While we have shown and pointed out our invention as applied above, it will be apparent to those skilled in the art that many modifications can be made within the scope and sphere of our invention.

What is claimed is:

1. An hermetic seal comprising a first disc having an aperture, one surface of the first disc carrying a first annular groove adjacent the periphery thereof, and a second solid disc, one surface of said second disc having a second annular groove adjacent the periphery thereof, said discs being positioned in mating contact with the first and second grooves being in registration to form a common conduit, said discs having a common periphery and being bonded together in the region extending between said common periphery and said common conduit.

2. An hermetic seal comprising a first disc having an aperture, one surface of the first disc carrying a first annular groove adjacent the periphery thereof, the other surface of said first disc having an annular channel disposed about and adjacent said aperture, and a second solid disc, one surface of said second disc having a second annular groove adjacent the periphery thereof, said discs being positioned in mating contact with the first and second grooves being in registration to form a common conduit, said discs having a common periphery and being bonded together in the region extending between said common periphery and said common conduit.

3. An hermetic seal comprising a first disc having an aperture, one surface of the first disc carrying a first annular groove adjacent the periphery thereof and at least one straight groove extending between said first annular groove and said aperture, the other surface of said first disc having an annular channel disposed about and adjacent said aperture, and a second solid disc, one surface of said second disc having a second annular groove adjacent the periphery thereof, said discs being positioned in mating contact with the first and second annular grooves being in registration to form a common conduit, said discs having a common periphery and being bonded together in the region extending between said common periphery and said common conduit.

4. An hermetic seal as set forth in claim 3 wherein said one surface of said first disc is provided with four straight grooves which extend between said first annular groove and said aperture, said straight grooves extending at right angles with respect to each other.

5. An hermetically sealed structure comprising a first disc having an aperture, one surface of the first disc carrying a first annular groove adjacent the periphery thereof, the other surface of said first disc having an annular channel disposed about and adjacent said aperture whereby a lip is formed between said channel and said aperture, a second solid disc, one surface of said second disc having a second annular groove adjacent the periphery thereof, said discs being positioned in mating contact with the first and second grooves being in registration to form a common conduit, said discs having a common periphery and being bonded together in the region extending between said common periphery and said common conduit, and a hollow tube open at at least one end, said end being bonded to said first disc with the tube wall being in registration with said lip.

References Cited by the Examiner

Vogel et al.: "Lasers: Devices and Systems—Part I," Electronics, vol. 34, No. 34, October 27, 1961, pp. 45 and 46 relied on.

Rigrod et al.: "Gaseous Optical Maser With External Concave Mirror," Journal of Applied Physics, vol. 33, pp. 743 and 744, February 1962.

JEWELL H. PEDERSEN, *Primary Examiner.*